Patented Aug. 8, 1939

2,168,888

UNITED STATES PATENT OFFICE 2,168,888

AZO PIGMENT PRODUCTION

Alfred Siegel, Roselle, N. J., assignor to E. I. du Pont de Nemours & Company, Wilmington, Del., a corporation of Delaware No Drawing. Application November 17, 1937, Serial No. 175,035

10 Claims. (Cl. 134—58.5)

This invention relates to the manufacture of lake pigments, and more particularly to the production of improved lake pigments containing rosin.

The use of metallic rosinates in the manufacture of certain azo pigments is well known, being specifically disclosed in United States Reissue Patent 18,590, wherein I appear as joint inventor with E. R. Allen. Although these rosinates or soaps are useful in the production of many azo pigments, they find particular effectiveness in the production of Lithol red (2-naphthylamine-1-sulfonic acid coupled with beta naphthol),—a color which appears in the trade principaly in the form of barium and calcium salts.

Although the range of tinctorial properties in azo pigments is potentially large, attainment of desired maximum depth of mass tone without attendant development of an undesirable weakness and blueness of the tint has not proved practical or possible heretofore. This disadvantage is especially true in the production of rosinated calcium Lithol reds. Again, satisfactory control over desired tinctorial properties and uniformity of product from batch to batch of such pigments has also proved quite difficult and in a great many instances impossible.

With a view to improving the properties of pigments, treating agents such as Turkey red oil, sulfite cellulose waste liquor, various resins as substitutes for the rosin, and various soap-like products have been proposed as useful, such agents being employed either alone or in combination with rosin. However, none have proved effective, the pigment after treatment still exhibiting a definite lack of desired improvement in mass tone, and an undesirable weakness and blueness of tint. Furthermore, these treating agents fail to effect desired or satisfactory control over the tinctorial properties of the pigment, or provide an effective means of stabilized procedure whereby uniformity in quality of pigment results.

I have found that if a relatively small amount of one or more of the well-known sulfuric acid esters of the higher fatty alcohols are employed during the processing of insoluble rosinated calcium salts of acidic dyestuffs, the disadvantages referred to are effectively overcome, and that the resultant pigment will exhibit highly improved tinctorial properties, greater depth of mass tone and improved strength. This is an entirely unexepected and novel result, and is very surprising considering the fact that when other dispersing agents, such as Turkey red oil, or those mentioned are employed, they fail entirely to effect such novel benefits. Thus, when such other agents are employed, the pigment exhibits only a lighter and duller mass tone, and this will be true even when such agents are employed in combination with rosin.

Accordingly, it is among the objects of the present invention to overcome the disadvantages alluded to and to provide a novel process which is particularly adapted to the production of pigments comprising the insoluble rosinated calcium salts of acidic azo dyestuffs, which will exhibit no undesired lack of improved mass tone or weakness and blueness of tint, but will inherently manifest greatly improved tinctorial properties, depth of mass tone and strength.

A further and additional object includes the provision of a stabilized and uniform process for the production of said rosinated calcium salt pigment, in order that uniformity and precise duplication of product from batch to batch will be assured and variance in pigment properties effectively avoided.

These and other objects and advantages are obtainable in my invention, which broadly comprises employing a relatively small amount of one or more of the sulfuric acid esters of the higher fatty alcohols as a treating agent during the processing of insoluble rosinated calcium salts of acidic azo dyestuff pigments, said ester or mixtures of the same being added, preferably, to the undeveloped azo dye subsequent to the completion of the coupling reaction but prior to the formation of the rosinated calcium salt.

A more specific and preferred embodiment of the invention involves the production of a rosinated calcium lithol red pigment by adding a relatively small amount of one or more of the sulfuric acid esters of the higher fatty alcohols to the undeveloped sodium salt of the rosin-containing Lithol red pigment.

In adapting the invention to practice, I preferably employ from 1 to 5%, based on the weight of the pigment, of a sulfuric acid ester of a higher fatty alcohol, i. e., a class of compounds which broadly exhibit some of the properties of dispersing agents and detergents. These esters are generally obtained by reacting aliphatic alcoholic compounds containing more than 8 carbon atoms with concentrated sulfuric acid or its equivalent, to give a class of compounds having the general formula R—O—SO$_3$H, wherein R is an aliphatic radical containing 8 or more carbon atoms. These comprise, for instance, the mono esters of sulfuric acid, readily forming metallic salts, of which the alkali metal salts such as sodium, potassium, etc. are especially valuable and useful. When the alcohol is unsaturated, as in the instance of oleyl alcohol, there is probably some addition of the sulfuric acid to the double bond to give a true sulfonate. The characteristics of these compounds are not sufficiently clear cut to state with certainty which compound predominates, but it is believed to be the true ester represented by the formula R—O—SO₃H given above. Examples of typical aliphatic alcoholic compounds which on sulfonation give treating agents suitable for use in the present invention include the following: octyl, decyl, dodecyl, myristyl, cetyl, lauryl, stearyl, oleyl, linoleyl, acetylated oleyl alcohol, etc., as well as mixtures of two or more of these and other long chain aliphatic alcohols, such as are obtainable by the hydrogenation of cocoanut fatty acids. These products are marketed under various trade names not descriptive of their chemical nature, hence, I designate them herein as the sulfuric acid esters or sulfates of the higher fatty alcohols, this expression being intended to be generic to the class of compounds referred to.

In order that the invention may be more clearly understood, the following specific example is given, wherein all parts are by weight, said example being merely in illustration of the invention, and not in limitation thereof:

*Example*

223 parts of Tobias acid (2 naphthylamine 1 sulfonic acid) are dissolved in 1500 parts of water containing 45 parts of caustic soda and diazotized in the usual manner after cooling to 0° C. with 74 parts of sodium nitrite and 128 parts of hydrochloric acid (100%).

In another container 160 parts of beta naphthol are dissolved in 1000 parts of water containing 112 parts of caustic soda and the solution made to 5000 parts at a temperature of 25° C. Coupling is brought about by adding the diazo slowly to the beta naphthol solution. After a period of stirring, the sodium salt is developed at the boil in the presence of 25 parts of I wood rosin, which had been previously saponified at the boil with 4 parts of caustic soda in 300 parts of water, and 16 parts of lauryl sodium sulfate. A further amount of rosin, 240 parts of B wood rosin saponified with 54 parts of caustic soda in 3500 parts of water, is then added and the mixture struck at the boil with 220 parts of calcium chloride in 2200 parts of boiling water. A final period of development at the boil is followed by quenching with cold water, filtering and washing free of dissolved salts.

About 610 parts of a very dark bluish red or maroon pigment results which is darker and brighter, stronger and yellower than a pigment made in the same manner but omitting the lauryl sodium sulfate treating agent.

While a specific amount of lauryl sodium sulfate has been employed in the foregoing example, and added to an undeveloped sodium lithol containing sodium rosinate, development of the sodium salt and conversion to the calcium salt being effected at the boil, it will be obvious that the amount so employed is subject to variance, and if desired may vary from 5 to about 35 parts by weight with relatively minor changes in the tinctorial properties of the resultant Lithol. Likewise, in lieu of lauryl sodium sulfate employment, any other alkali metal or other water-soluble salts of the sulfuric acid esters, or sulfates, of the higher fatty alcohols mentioned, or mixtures of the same, may be used. As indicated, I preferably add the treating agent to the solution, or suspension, containing the undeveloped pigment subsequent to the completion of the coupling reaction but prior to the conversion to the calcium salt, so that the precipitation of the calcium salt is effected in the presence of the treating agent. Although this procedure will be found preferable, in view of the more satisfactory and consistent results which ensue, the treating agent may be incorporated into the reaction mixture either by addition to either component of the coupling reaction or the suspension of the precipitated pigment prior to or during its development at elevated temperature.

While the invention has been illustratively described in its preferred embodiment for the production of rosinated calcium Lithol reds, my treating agents may obviously be employed in the production of other types of rosinated azo azo dyestuffs which contain acid azo pigments which contain one or more carboxyl groups and/or sulfonic acid groups and which are usually employed for conversion into lakes to form water-insoluble calcium salts.

Likewise, although specific amounts of rosin have been employed in the foregoing example, it will be obvious that the type and amount of rosin so used is subject to variance within wide limits. For example, a pure grade of rosin, such as I wood rosin or M gum rosin, may be used in lieu of the B wood rosin, whereby the resultant pigment is much lighter and yellower. In general, and as more particularly set forth in said Reissue Patent 18,590, I contemplate employing substantial quantities, i. e., from 15 to 50%, of metallic rosin soaps or rosinates, by which terms I mean to include the metal salts of the rosin acids and related compounds, which in the case of the alkali metals are soluble in water, and in the instance of the alkali earth and other metals are insoluble in water. Although I have specified a 15 to 50% range of metallic rosinates, it will be found when these agents are used in combination with the sulfuric acid esters of higher fatty alcohols, as herein provided, the range specified may be varied somewhat, particularly the lower limit thereof, and that if desired, amounts less than 15% of rosin may be utilized, even to as low as 8–10%, with the obtainment of desired tinctorial properties, coupled with appreciably greater strength in the resultant pigment. Preferably the rosin soap is incorporated with the azo compound prior to filtration, and the soap is converted into an insoluble metallic rosinate simultaneously with precipitation of the azo compound. Although this is a preferred procedure, it will be obvious the rosin soap may be added during the coupling or at some other stage of pigment processing, similar to and as set forth in said Reissue Patent 18,590.

From a practice of my invention, it will be found that use of my novel treating agents results in desirable and especially valuable tinctorial effects, such as the dark, bright mass tones and the strong, clean and brilliant tints. These results and differences are not merely in degree, but large and substantial in extent. The resultant pigments are greatly desired by the trade and have been heretofore unobtainable consistently by any known method. The use of my